United States Patent
Watts et al.

[19]

[11] Patent Number: 6,119,186

[45] Date of Patent: Sep. 12, 2000

[54] COMPUTER SYSTEM WITH ENVIRONMENTAL MANAGER FOR DETECTING AND RESPONDING TO CHANGING ENVIRONMENTAL CONDITIONS

[75] Inventors: LaVaughn Watts, Temple, Tex.; Kevin D. Davis, Beaverton, Oreg.; John Linn, Richardson, Tex.

[73] Assignee: Texas Instruments Incorporated, Dallas, Tex.

[21] Appl. No.: 09/073,371

[22] Filed: May 5, 1998

Related U.S. Application Data

[60] Provisional application No. 60/050,930, May 30, 1997.

[51] Int. Cl.[7] .............................. G06F 9/24; G06F 15/177; G06F 13/10
[52] U.S. Cl. ........................................... 710/104; 713/100
[58] Field of Search ................... 710/104, 8, 11, 710/62, 129, 260, 100; 709/203, 204, 300, 220, 237, 221; 713/310, 320, 323, 100, 1, 2; 379/88.13; 340/825.06; 714/3; 711/170

[56] References Cited

U.S. PATENT DOCUMENTS

| | | | |
|---|---|---|---|
| 5,289,372 | 2/1994 | Guthrie et al. ............................. | 705/28 |
| 5,373,553 | 12/1994 | Mintz et al. .............................. | 379/220 |
| 5,576,972 | 11/1996 | Harrison ................................... | 702/128 |
| 5,721,936 | 2/1998 | Kikinis et al. .......................... | 713/323 |
| 5,754,798 | 5/1998 | Uehara et al. ........................... | 710/104 |
| 5,819,030 | 10/1998 | Chen et al. .............................. | 709/220 |

*Primary Examiner*—Gopal C. Ray
*Attorney, Agent, or Firm*—Ronald O. Neerings; Frederick J. Telecky, Jr.

[57] ABSTRACT

A computer uses an environmental manager (20) to detect and respond to changing environmental conditions, in order to enhance and simplify a users interaction with the computer. Environment changes are detected by a plurality of informants (22), each of which has a specified function. Informants communicate through a CIM (26). The CIM (26) establishes communication channels with each informant regarding which information will be provided by the informant and which information that informant needs from other informants. Informants (22) may receive environmental information from a number of sources, including physical location detectors, hardware configurations, software configurations, and network connections. As environmental conditions change, the informants and applications may respond to the changes. A particular capability to respond is the autolaunch capability which detects user behavior and uses this knowledge to automatically load a program responsive to changing environmental conditions.

56 Claims, 12 Drawing Sheets

COMPUTER SYSTEM WITH ENVIRONMENTAL MANAGER FOR DETECTING AND RESPONDING TO CHANGING ENVIRONMENTAL CONDITIONS

This application claims priority under 35 USC § 119(e)(1) of provisional application Ser. No. 60/050,930 filed May 30, 1997.

CROSS REFERENCE TO RELATED APPLICATION

This application claims the benefit of the filing date of copending provisional application U.S. Ser. No. 60/050,930, filed May 30, 1997, entitled "Computer System With Environmental Manager" to Watts et al.

This application is related to U.S. App. Ser. No. 08/759,899, entitled "Graphical User Interface" to Freach et al filed Dec. 3, 1996, U.S. Ser. No. 60/048,139 entitled "Computer System With Environmental Messaging Structure" to Fuiks et al filed May 30, 1997 and U.S. Ser. No. 60/048,086 entitled "Computer System With Environmental Detection" to Watts filed May 30, 1997.

BACKGROUND OF THE INVENTION

1. Technical Field

This invention relates in general to computing and control devices and, more particularly, to an environment manager for computing and control devices.

2. Description of the Related Art

The advent of the personal computer has changed the ways in which people work. While only a small percentage of people had access to computers fifteen years ago, almost everyone has access to a computer today. Further, the computer has become an important tool in both the professional and private lives of many people.

The mobile computer allows people to have computing power on demand. In turn, the computer has become, for many people, a tool which is used in a variety of places and in a variety of different ways. It may be used in the office for document production, in meeting rooms and in the field for presentations, on airplanes for administrative tasks, and in the home for entertainment, education, household management, and off-hours work.

While the computer has empowered users in many ways, the complexity of operation often offsets, or overcomes, its benefits. In particular, today's computers are directed towards a single user at a single location. In fact, computers are often used by multiple people and in multiple workplaces. As the users and/or workplaces change, today's computer requires user interaction to adapt to the new circumstances.

For example, a user at the office may need resources such as a printer, scanner, or group-ware computing environments, and have access to a docking station with a large, high-resolution monitor, whereas the same user on an airplane needs batteries, small footprints and ease of access to local data. At home, the user may connect to a different printer and a smaller monitor. While in the office the user may use word processing, spreadsheet and scheduling software heavily, while he or she may use a financial program and entertainment software at home.

The interaction required by a user due to changing circumstances may take many forms, from changing an electronic-mail (e-mail) address to modifying network connections. As the difficulty of the interaction increases, the value of the computer decreases. Accordingly, many users avoid portable computers, even though the realize the benefits of mobility, to avoid the complexity of operating the computer in various circumstance, or under-use the power of portable computer.

Accordingly, a need has arisen for a method and apparatus for enhanced computing functionality.

SUMMARY OF THE INVENTION

The present invention provides a computer which detects changes in an environment associated with the computer, determines an optimum configuration based on the new environment and modifies the configuration of the computer based on the optimum configuration.

The present invention provides significant advantages over the prior art. When the environment changes due to changes initiated by a user or by changes in the environment of the computer, the configuration can be controlled to aid the user. For example, programs can be automatically loaded by the computer based on prior experiences or hardware configurations could be modified. According, the user involvement in setting a computer to a desired configuration in many different circumstances can be greatly reduced.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5b, 5c, and 5d are state diagrams illustrating changing of computer configuration in response to changes by the environmental detection sources of FIG. 5a;

DETAILED DESCRIPTION OF THE PREFERRED EMBODIMENT

The present invention is best understood in relation to FIGS. 1–17 of the drawings, like numerals being used for like elements of the various drawings.

Figure 1:
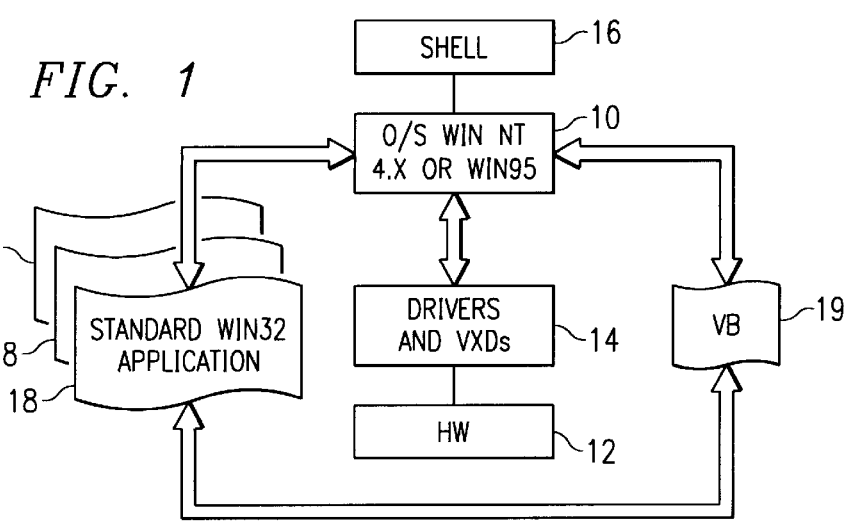
FIG. 1 illustrates a block diagram of a prior art computer operating system architecture under WINDOWS 95.

FIG. 1 illustrates a functional diagram of a prior art computer. The basic operations of a computer are controlled through its operating system 10. A number of different operating systems are in widespread use today. A few of the more popular operating systems include WINDOWS 95 and WINDOWS NT (by Microsoft Corporation), SYSTEM 7.5 (by Apple Computer) and UNIX (available from a variety of vendors under different names). While FIG. 1 shows a basic operational block diagram for WINDOWS 95, other operating systems would be similar in functionality.

The operating system 10 communicates to hardware 12 through device drivers and VXD's (virtual device drivers) 14. "Hardware" includes, for example, the video/graphics adapter, sound card, serial and parallel ports, CD-ROM (compact disk read only memory), hard and floppy drives, tape backup units, keyboard, modem, monitor, mouse and network adapter.

The operating system 10 communicates with the user through a shell 16, sometimes referred to as the graphical user interface (GUI). The shell 16 controls the manner in which information is displayed (or otherwise output) to the user and allows the user to input information to the computer.

Application software 18 is designed to work on a specific operating system (although some applications can work on multiple, related operating systems such as WINDOWS 95 and WINDOWS NT). The applications 18 communicate with the hardware 12 through the operating system 10 and drivers 14 and communicate with the user through the operating system 10 and shell 16. Modern day operating systems are "multitasking", i.e., they allow multiple application programs to operate simultaneously.

VB (Visual Basic) script 19 is shown as an example of a language which can be used by developers or users for programming operations within a program. VBA (Visual Basic for Applications), for example, allows programming within an application over a wide assortment of applications sold by MICROSOFT. A user or developer may use this program to automate steps, such as automatically filling in cells of a spreadsheet responsive to inputs on a custom dialog box.

Figure 2:
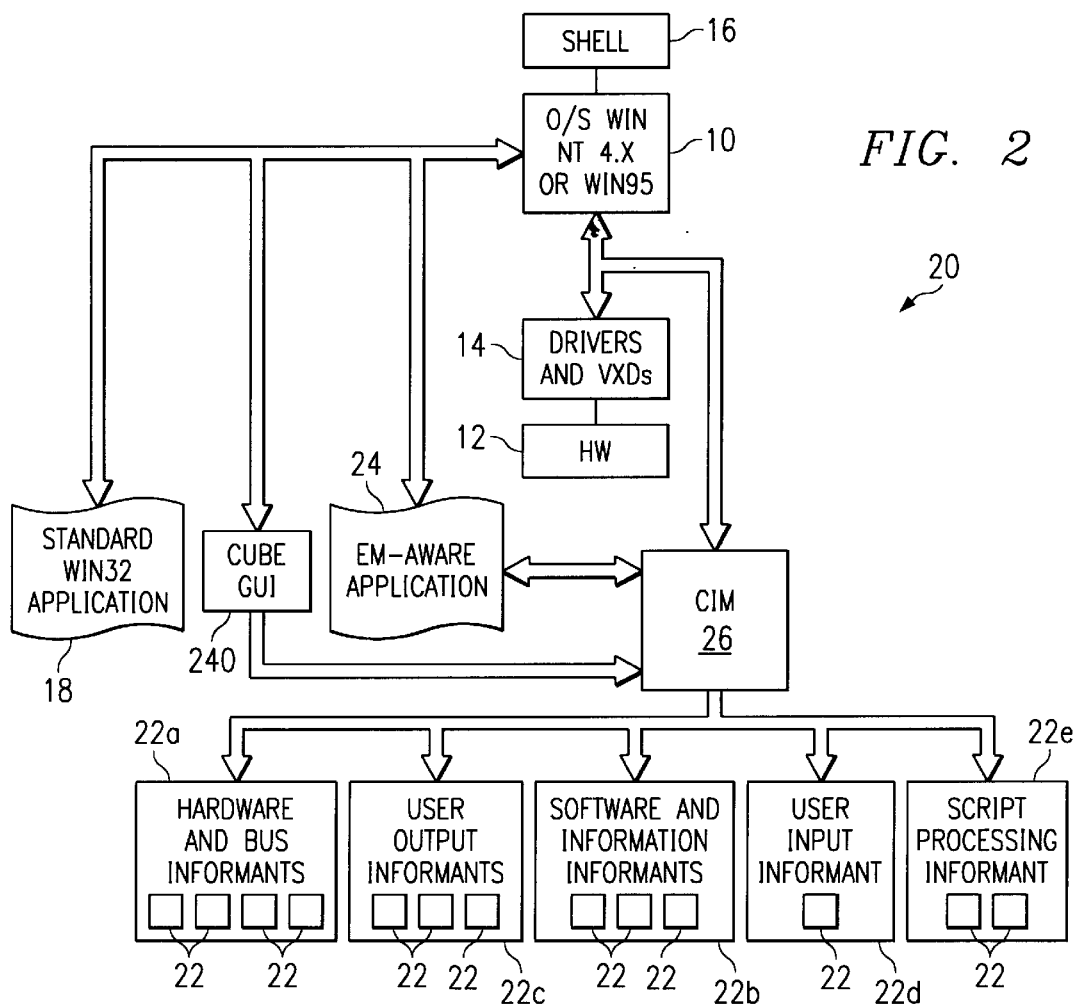
FIG. 2 illustrates a block diagram of an environmental manager architecture.

An overview of the environment manager of the present invention is shown in FIG. 2. The environment manager 20 works in conjunction with an operating system 10 to provide functionality to overcome many of the shortcomings of present day computers. While, for purposes of illustration and explanation, the environment manager 20 will be discussed in connection with WINDOWS 95, it could be designed to work with any existing or future operation system 10.

The environment manager 20 includes a plurality of informant programs (hereinafter "informants") 22 which communicate between themselves and to environment manager aware application programs (hereinafter "EM-aware applications) 24 through a central intelligence module (hereinafter CIM) 26. An EM-aware application 24 can be thought of as an application program which has some or all of the messaging capabilities of an informant. Hence, FIG. 2 illustrates EM-aware applications 24 as an application including an informant 22 for messaging purposes. The CIM 26 also communicates with the operating system 10 and drivers 14.

In operation, the informants 22 gather and disseminate information. The CIM 26 acts as a conduit for routing information between informants 22, including the informant sections 22 of EM-aware applications 24.

Informants 22 are receivers and generators of information regarding all aspects of operation of the computer system. Classes of informants shown in FIG. 3 include hardware and bus informants 22a, software informants 22b, user output informants 22c, user input informants 22d and script processing informants 22e, Particular informants 22 within the hardware class would include, for example, docking informants to detect and manage docking functions for a notebook computer, power informants to detect power sources and to automatically turn devices on and off, modem informants to detect and control different modem types (data, data/fax, data/fax/voice, cellular), printer informants to handle printer connections and print jobs, monitor the status of the parallel port for a printer which is directly connected to the computer, monitor network connected printers, monitor infra-red connections, and GPS informants which interface with a global positioning system (GPS). Bus informants would include, for example, informants for providing information and controlling network connections (direct connect and wireless), PC Card connections, SCSI connections and infra-red connections. Software informants would include environment informants to determine local environmental factors such as local area code, time zone, zip code and so on, scheduling informants to schedule activities at specific times, workspace informants to monitor activities in each workspace and maintain histograms to determine the most used user commands, and autostart informants to automatically launch applications based on usage and user choice.

It should be noted that the list of informants provided herein is merely for illustration purposes. In an actual embodiment there could be many more informants to detect, monitor and control events within a computer system and between computer systems.

The communication structure shown in FIG. 2 allows complete information dissemination between various software and hardware components in a computer system (and with other computers through a network). As a result, the computer has an enhanced ability to adjust to different environments in order to simplify its interaction with the user.

Central Information Manager

CIM 26 is the central coordinating authority for messages. In the preferred embodiment, all messages between informants 22 are sent to each other via the CIM 26, rather than directly. The CIM 26 maintains a table (the "dispatch table") which identifies particular messages desired by each informant 22 and the messages that that informant 22 will supply. For example, an EM-aware graphics application 24 may be interested, among other things, whether a scanner is turned on, whether a digitizing tablet is attached, and specific information about the scanner and/or digitizing tablet. Thus, upon loading the EM-aware graphics application, the CIM 26 would note in its dispatch table the different types of information requested by the informant 22 of the graphics application. During operation, if a scanner informant sent a message indicating that the scanner had been turned off, the CIM would look in its dispatch table to determine which informants 22 were interested in that message. The CIM 26 would then forward the message to the informant of the EM-aware graphics application, and to any other informants 22 linked to the message in the dispatch table.

In the preferred embodiment, information can be received by informants 22 by two mechanisms. The first is the routing of information to interested informants 22 by reference to the dispatch table of the CIM 26. A second mechanism is by querying. In a query, an interested informant 22 requests information from the CIM 26. For example, when the EM-aware graphics application is executed for the first time, it may send out several queries to determine the current state of the computer. Thus, it may request information regarding the state of the scanner. The CIM 26 would then query the appropriate informant 22 which is responsible for maintaining information regarding the state of the scanner. If the informant is not currently active, the CIM 26 would be responsible for loading the appropriate informant 22 as well. After performing whatever steps were necessary to obtain the information for which it was responsible, the informant 22 would reply to the CIM 26 with a message containing the requested information; that message would be forwarded by the CIM 26 to the graphics program which initiated the query.

Figure 3:
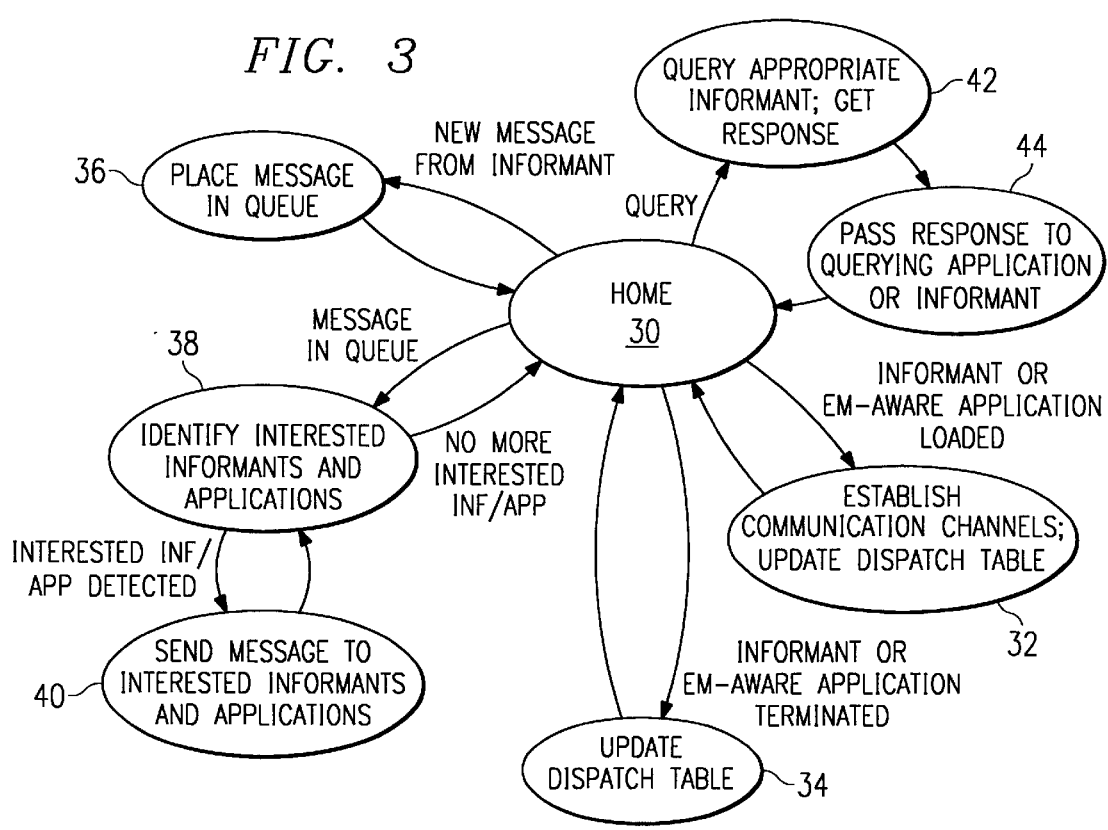
FIG. 3 illustrates a state diagram describing operation of a Central Information Manager (CIM)

FIG. 3 illustrates a state diagram describing operation of the CIM 26. The CIM 26 coordinates and routes all messages between informants 22. State 30 is the home state. When an informant 22 is loaded, CIM 26 establishes communication channels with the newly loaded informant 22 in state 32. The communication channels which are established include: (1) the channel through which messages will be sent from the informant 22 to the CIM 26, (2) the channel which messages will be forwarded from the CIM 26 to the informant 22, and (3) the channel through which the informant 22 is queried for information. Further, in state 32, the dispatch table is updated to (1) define which messages are available from the newly loaded informant 22 and (2) designate which messages are to be sent to the newly loaded informant 22. When the actions in state 32 are completed, the CIM 26 returns to the home state 30.

When an informant 22 is terminated, the CIM 26 transitions to state 34 where it updates the dispatch table to note that the terminated or informant 22 is no longer available to receive or generate messages.

When a new message is received from an informant 22, the state shifts to state 36, where the message is placed in a FIFO (first in first out) memory queue controlled by the CIM 26. The queue allows multiple messages to be received by the CIM 26 while another message is being dispatched by the CIM 26 to one or more interested informants 22.

Whenever the CIM 26 detects that the message queue is not empty, it shifts to state 38, where the CIM determines which informants 22 (including EM-aware applications 24) are interested in the information (established in state 32 as each informant is loaded). For each identified informant 22, the CIM 26 sends the message to that informant 22 in state 40. The loop between states 38 and 40 continues until the message has been received by all interested informants 22. If there are additional messages in the queue, the CIM 26 will return to state 38 to service the next message as described above.

The second method through which an informant 22 can receive information is by querying the CIM 26. When the CIM 26 receives a query from an informant 22, it transitions to state 42. In state 42, the CIM 26 determines which informant 22 is the source of the desired information. That informant 22 is sent a query by the CIM 26 and returns a message with the desired information in response to the query. The CIM 26 may have to load an informant 22 if that informant is not active and needed to service the query.

In state 44, the CIM 26 forwards the message to the informant 22 which initiated the query.

Informants/EM-Aware Applications

Figure 4:
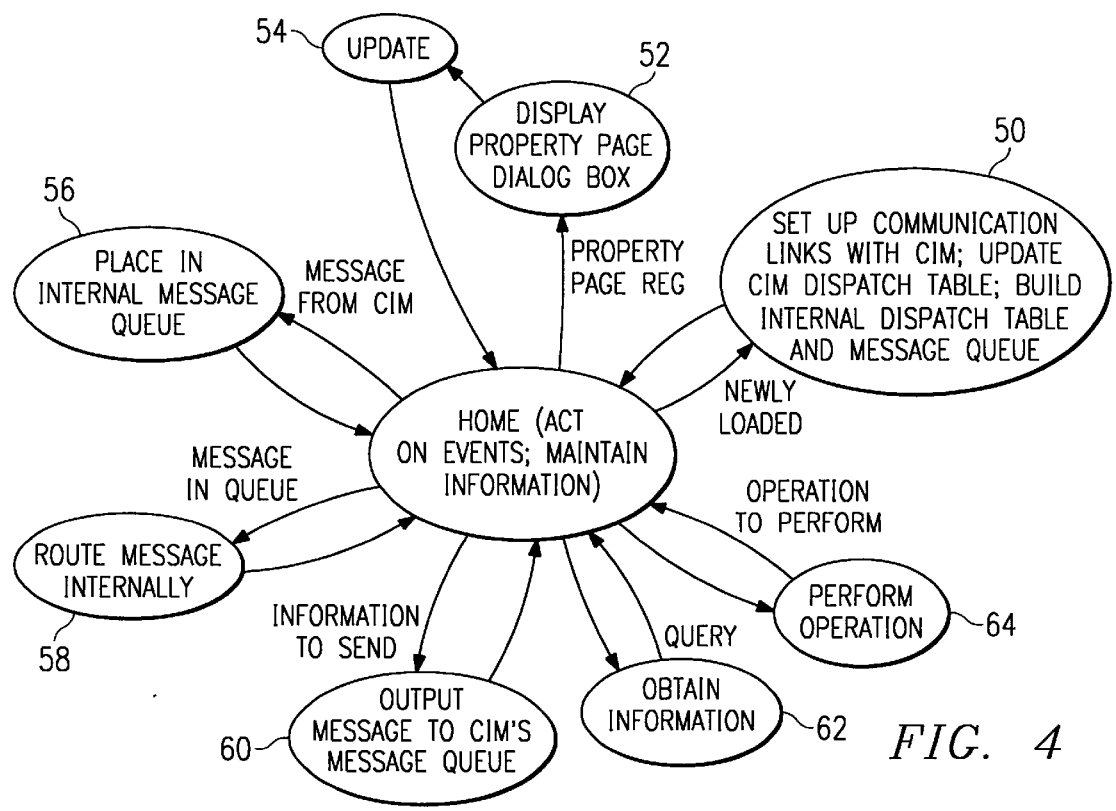
FIG. 4 illustrates a state diagram describing operation of an informant.

FIG. 4 illustrates a block diagram describing the basic operation of an informant 22 (including the informant portion of an EM-aware application 24). State 50 is the home state, from which the informant 22 monitors and acts on events and maintains information. Upon execution, the informant 22 sets up a communication link with the CIM 26 in state 52, as described above in connection with state 32 of FIG. 3. Specifically, the informant 22 exchanges information on which messages it will be sending the CIM 26, which messages the CIM should forward to the informant 22, and the identification of the channels for sending and receiving messages and queries. In addition, the informant 22 builds it own internal dispatch table and message queue.

If an informant is user-configurable, it is responsible for providing an interface, typically a dialog box, to which the user can enter configuration parameters. If there is a property page request, the dialog box is displayed in state 54, and information is received from the user. In state 56, any updates to the operation of the informant 22 are implemented.

When an informant 22 receives a message from the CIM 26, it places the message in the internal message queue in state 58 by reference to its internal dispatch table. When a message is in the queue, the state changes to state 60, where the message is routed internally to its proper destination. In other words, in the preferred embodiment, the CIM 26 sends all messages to a given informant 22 over a single communication channel, even if the informant 22 is requesting multiple messages. Once received, the informant 22 routes the message to its proper internal destination using its internal dispatch table to determine the proper destination.

If an informant 22 has a message to send, it will output the message over the designated channel to the message queue of the CIM in state 60. Not all informants 22 generate messages; some informants only receive messages.

If an informant is requested to provide information by the CIM 26 (in response to a query from another informant 22), it obtains the information in state 62. After obtaining the information, the message or messages would be sent to the CIM 26 in state 60 as described above.

Some informants 22 will act upon information received from other informants 22 or generated internally. Such actions could include, for example, generating additional information to be sent to the CIM 26, modifying system resources (such as changing the resolution of the display or disabling peripherals to conserve energy), modifying other software or the operating system or displaying information to the user. Thus, the state diagram of FIG. 4 has a state 64 where operations are performed when an action is required.

Each informant 22 is responsible for maintaining its own information. Some informants 22 may store data even while inactive (by storing the data in non-volatile memory, such as a hard drive, for example), while others may not store data at all. The CIM 26, in the preferred embodiment, does not store information received from the informants 22 other than temporarily in the CIM's message queue while a message is being sent to the informants.

Informants 22 are typically implemented as DLLs (dynamic link libraries) or a COM (Common Object Module) in a WINDOWS 95 environment. Depending upon the operating system, the informants may have additional responsibilities. In a WINDOWS 95 environment, each informant 22 has its own signature which specifies certain information, such as organization name, informant name, and informant class (such as modem), messages received and messages sent. This information is stored to the operating system's registry during installation.

Environmental Monitoring

The messaging system described above in connection with the CIM 26 and the informants 22 (and EM-aware applications 24) allows a device to monitor and react to environmental changes. Any change which can be detected by the computer (or other device) and could or should affect its operation can be thought of as an environmental change. Some of the possible changes are discussed below.

One significant environmental change would be a user change. Most users have different preferences in interacting with a computer. Some preferences concern the user interface, such as screen resolution and colors, default printer and organization of programs and documents on the screen (the "desktop"), for example. Other preferences concern the use of the computer. For example, a parent may use the computer mostly for word processing and e-mail, while a child may use the same computer mostly for games and educational programs.

Another significant environmental change concerns the physical connections made to the computer. A notebook computer may sometimes be connected to a network through a docking station and be disconnected from the network entirely at other times. It may also be connected to other networks through a PC Card connection, other docking stations, or by a wireless network card.

Additionally, the peripherals in a computer often change, particularly in a notebook computer where there are typically one or two PC Card slots for receiving devices such as modems, network interface cards, Zoomed video cards, sound cards, and hard drives to name a few PC Card devices. Additionally, many notebook computers have option bays where the user may switch between a floppy drive, hard drive, CD-ROM or other storage device.

The configuration of a notebook may also change when it is loaded onto a docking station, which, in addition to a network connection, may have different mass storage devices, video/graphics circuitry, sound devices, and other peripherals such as scanners.

Another type of environmental change is a change of physical location, which may or may not entail changes to physical connections. It is common to use a notebook computer in many different physical locations, such as in the office for work, in the home for work and entertainment, in remote offices and conference rooms for presentations and note-taking, and in automobiles, trains, subways and planes for off-site work.

The normal operation of the computer may change in response to its environment. In a house, the computer may be used in a child's bedroom solely for games and education programs and used in the parent's bedroom solely for word processing and e-mail. In the kitchen it may be used for recipes by a parent or for games by a child.

Additionally, the location of the computer may affect its optimal mode of operation. For example, if the computer is being used in an airplane, it may be running off of batteries. It is desirable that the batteries last as long as possible, since an alternative power source is generally not available in an airplane. A battery informant, upon receiving information that the computer was being used in an environment where AC power was not available, could identify subsystems in the notebook which would probably not be used, such as a modem or a network connection, and power down those subsystems in order to conserve energy.

The operational status of the computer also affects its environment. As the computer's hard disk becomes low on free space, for example, a hard disk informant could identify files which had not been accessed recently and compress those files. Alternatively, the hard disk informant could modify system parameters such as the size of the swap file (which the operating system creates as virtual memory) and/or the size of an Internet browse cache in order to create more hard disk space.

A computer's environment is also changed by the set of programs being run. When a program is running a word processing program and a scheduling program, it is in a different environment from when it is running an entertainment program and an Internet connection.

Detecting Environments

In the preferred embodiment, a notebook computer is able to detect environments through its informant/CIM structure described above in connection with FIGS. 2–4. Environmental information is then used to (1) control operation of the computer to optimize the notebook computer's performance, (2) reduce efforts on the user to properly configure the computer for a given environment and (3) anticipate user desires.

Figure 5A:
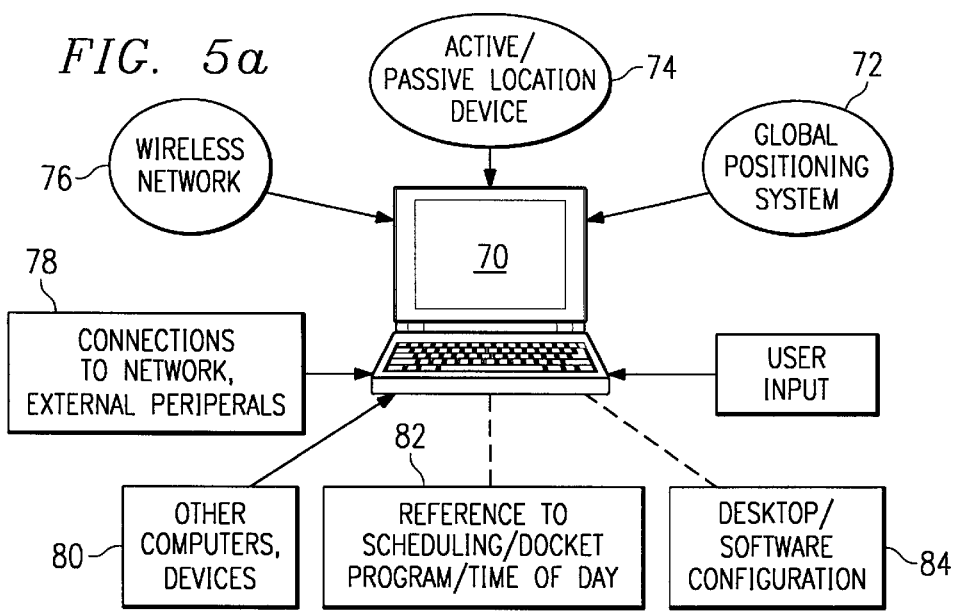
FIG. 5a illustrates a diagram of environmental detection sources.

FIG. 5a illustrates a diagram showing various detection mechanisms which could be used in conjunction with a notebook computer to provide environmental information, some or all of which could be used in a given situation. The notebook computer 70 has circuitry to receive signals from a GPS device 72, active/passive location device 74 or wireless network 76. Wired connections can be made to networks or external peripherals 78 through the computer's ports (serial/parallel) and buses (PC Card slots, option bays and other external bus connections). Other computers and devices, such as Personal Digital Assistants (PDAs, sometimes referred to as handheld or palmtop computers), can be coupled to the notebook computer 70, either by wired or wireless connections. Internally, the notebook computer can reference information stored in various databases, such as a scheduling program, and the computer's time/date circuitry 82. The computer 70 can also detect its internal configuration of active programs and desktop configuration 84 (the configuration in which the user views and interacts with the programs).

Global positions systems 72 are currently available to interface with computers and some mapping programs can accept information from a global position system to locate the position of the user on a map. This information could also be used by the computer to determine physical location environmental information. For example, the information from a GPS device 72 could be used to determine whether the computer was being used at the office, at home, in an aircraft or train, or at a remote site.

Active/Passive location devices 74 are similar to GPS systems, but are more localized. Active location devices would include devices for which could identify certain locations. For example, a transmitter which output a 20-bit number could be place in each room which required identification, such as each office and conference in a place of business and each room in a house. The transmitters could output the number whenever movement was detected within the room or in response to a signal from the computer. The computer would map the numbers to their actual location, so that it would be aware of its physical location. Passive location devices could include, for example, a bar code which was scanned upon entering a room.

Wireless networks 76 are also currently available and are particularly useful for notebook computers, since the network connection can be made while allowing the notebook computer to remain portable. In addition to the network connection, the wireless network connection can provide information on the physical location of the notebook computer and to the resources to which the notebook computer has access.

Wired networks 78 can also be coupled to the notebook computer 70 through network interface card, typically through a PC Card interface, internal circuitry or a docking station. Information about the whereabouts of the computer can also be provided through communication with the wired network. Other peripherals can be connected to the notebook computer's parallel and serial ports, such as printers, modems, scanners, mass storage devices such as a ZIP drive, made by Iomega Systems, Inc.

PDAs, programmable calculators and personal organizers 80, such as those manufactured by Texas Instruments, Sony Corporation, US Robotics Corporation, Casio and Apple can exchange information with the notebook computer 70 through a port or through wireless transfer. Other accessories, such as the TIMEX DATALINK watch can receive information with the notebook computer. It would be possible to provide interfaces with other appliances, such as television sets, video tape recorders and alarm systems.

The computer's environment can also be determined by database information, either internal to the notebook computer 70 or from other sources, such as a network connection. The computers internal time/date circuitry can determine the present time and use the scheduling information to determine its present location or its desired configuration.

The configuration of a computer's desktop or active programs also provides environmental information. When a computer is executing one or a set of education programs, it could be assumed that a certain user is using the computer. On the other hand, when a scheduling program is being run, the user can be determined by reference to the particular database (since the scheduling program may have separate databases for different users).

User-provided information may also be used to identify an environment. A user may explicitly state an environment (such as by selecting "office" from a list of environments) or choose a desktop (from a graphical user interface which supports multiple desktops) which would indicate an environment.

Environment information is often determined not from a single source, but from multiple sources. For example, a notebook computer may be turned on at 10:00 AM and recognize that it is connected to the docking station in the office associated with User1. The scheduling program may indicate that User1 has a meeting at 10:15 to present materials on Project1. While the computer can easily determine the physical location of the computer as User1's office (by identifying the docking station and network connection), it can also determine a desired software configuration, namely those programs and document associated with Project1. Accordingly, it may initiate execution of the programs needed for Project1 (or at least prompt User1 to determine if he or she desires to run those programs). It may also determine which resources associated with the conference room will be needed for the presentation and prompt the user if additional resources, such as a overhead projector and an LCD panel, will be needed for the presentation.

Figure 5B:
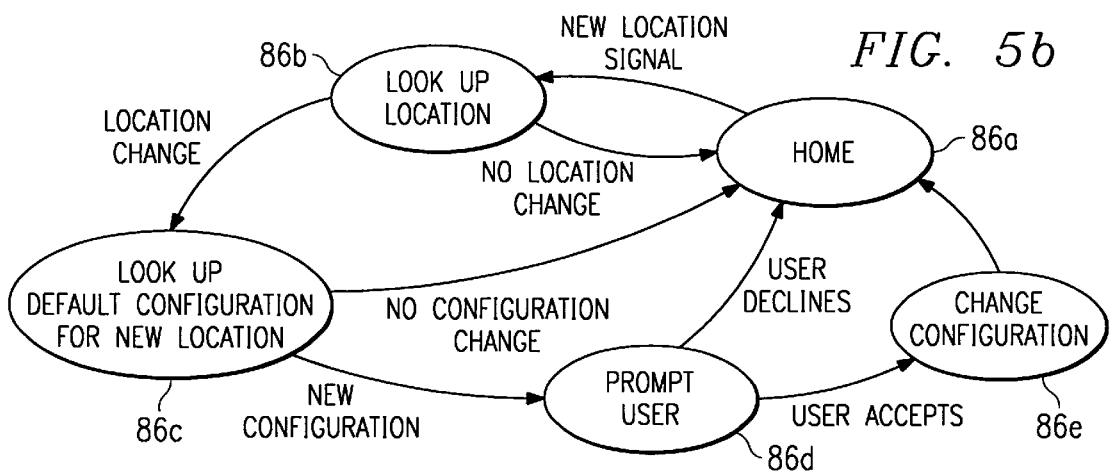
Figure 5C:
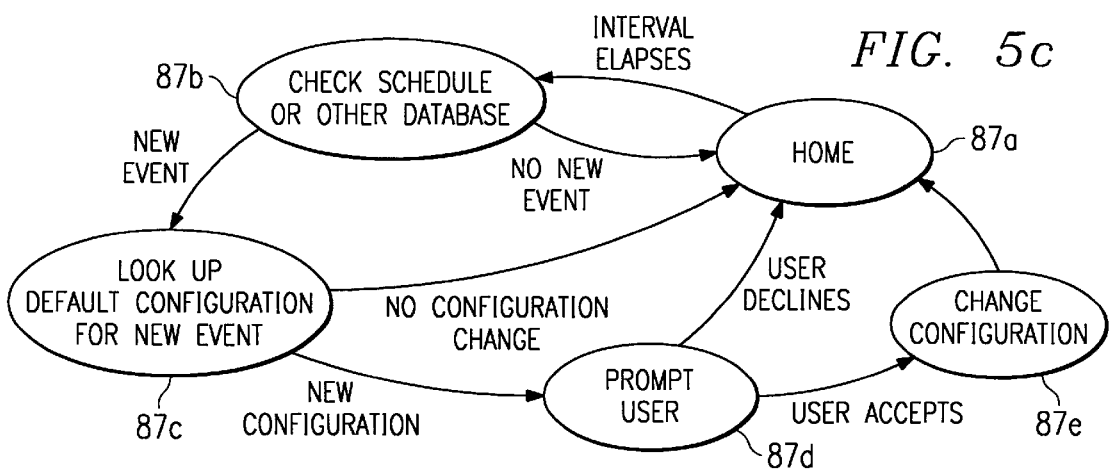
Figure 5D:
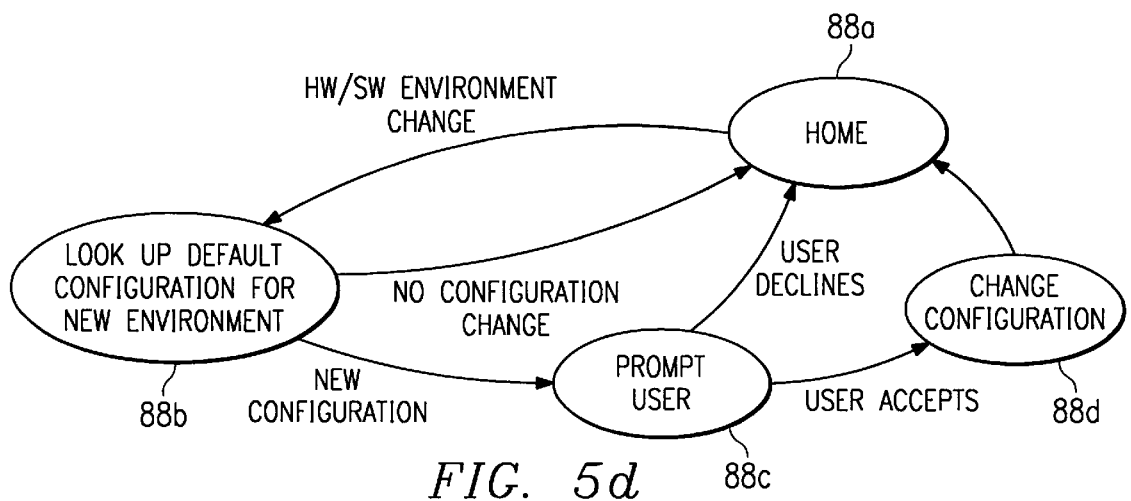

FIGS. 5*b*–*d* illustrate changes in a computer's configuration which could be made responsive to detected environmental changes. FIG. 5*b* illustrates how location detection devices, such as the GPS, active and passive location devices shown in FIG. 5*a*, can be used to control the configuration of a computer. From home state 86*a*, control is transferred to state 86*b* when a new location signal is received. The location signal could be received from the GPS circuitry on a periodic bases, or from active sensors disposed throughout an office or input by a user through a scanner or a keyboard. In state 86*b*, the location is determined, for example, by reference to a database which relates numeric codes to locations. In some instances, a new location signal may not result in a change in location (for example, if the GPS signal changed as the computer was moved from one end of a conference room to another); in that instance, control switches back to the home state 86*a*. Assuming there is a location change, control is switched to state 86*c*, where a configuration is determined. For example, if the location is determined to be an airport, measures for conserving batteries may be taken. In another example, if the location was determined to be a conference room in an office which had a wireless network, the computer could be configured to access the wireless network.

Prior to making the changes to the computer's configuration, however, the user is prompted whether the changes are desired in state 86*d*. If the user declines, control switches back to the home state 86*a*. Otherwise, if the user accepts the changes, the configuration is changed in state 86*e* prior to returning to the home state 86*a*. It should be noted that a change in location will not always result in a change in configuration. In this case, control returns directly to the home state 86*a* from state 86*c*.

FIG. 5*c* illustrates how database references, such as referring to a scheduling program, can be used to control the configuration of a computer. From home state 87*a*, control is transferred to state 87*b* periodically to check a database, such as a scheduling database. If there is no scheduled docket or meeting event, control switches back to the home state 87*a*. If there is an event, control is switched to state 87*c*, where a configuration is determined. For example, if a presentation is docketed for completion, the presentation software may be executed and the intended presentation document loaded. If, for example, a meeting is scheduled in a conference room, the configuration of the computer could be modified to connect to the network, wired or wireless, available from the conference room.

Prior to making the changes to the computer's configuration, however, the user is prompted whether the changes are desired in state 87*d*. If the user declines, control switches back to the home state 87*a*. Otherwise, if the user accepts the changes, the configuration is changed in state 87*e* prior to returning to the home state 87*a*.

FIG. 5*d* illustrates how the hardware and software environment can be used to control the configuration of a computer. From home state 88*a*, control is transferred to state 88*b* the hardware or software configuration changes. The change could be detected by software informants in conjunction with the operating system. In state 88*b*, a default configuration is determined for the current software environment. For example, if the computer detects that the user has changed from an "Work Office" desktop to a "Home Office" desktop, it can configure the computer to be operating in the home environment. The default configuration would depend upon the user, but in a exemplary configuration, the computer could determine if the computer was connected to a telephone line and connect to the office computer through a remote access program.

Once again, prior to making the changes to the computer's configuration, however, the user is prompted whether the changes are desired in state 88*c*. If the user declines, control switches back to the home state 88*a*. Otherwise, if the user accepts the changes, the configuration is changed in state 88*d* prior to returning to the home state 88*a*.

Responses to Environmental Information

In accordance with environmental information, the notebook computer 70 can adjust its operations to increase productivity. The number of possibilities are limitless; a few examples are given below.

Figure 6:
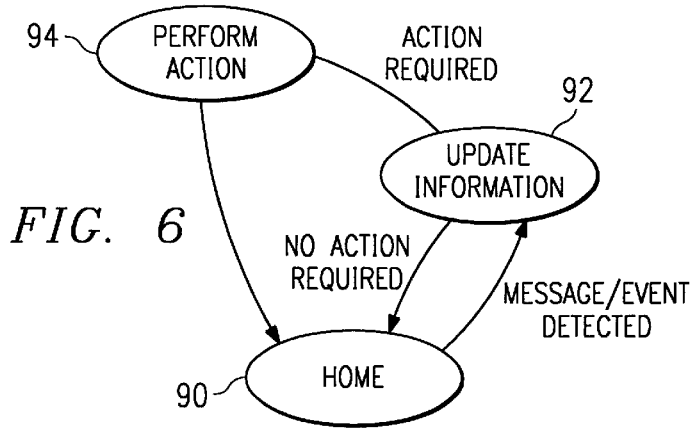
FIG. 6 illustrates a state diagram describing the operation of an informant responsive to receiving environmental information.

FIG. 6 illustrates a basic diagram showing the operation of an informant 22 or an EM-aware application 24 responsive to environmental information. From home state 90, the informant 22 or EM-aware application 24 transitions to state 92 responsive to receiving environmental information either from another informant 22 or by deriving the information itself. In state 92, the informant 22 or EM-aware application 24 updates it information. New information will not always result in an action. If no action is required, the informant 22 or EM-aware application 24 returns to state 90. Otherwise the action is performed in state 94.

The action which may be taken are many fold. The informant 22 may send a message to CIM 26 which causes other informants or EM-aware applications 24 to take actions. The informant itself may take actions such as automatically launching an application, adjusting system operation or configuring the operating system.

Figure 7:
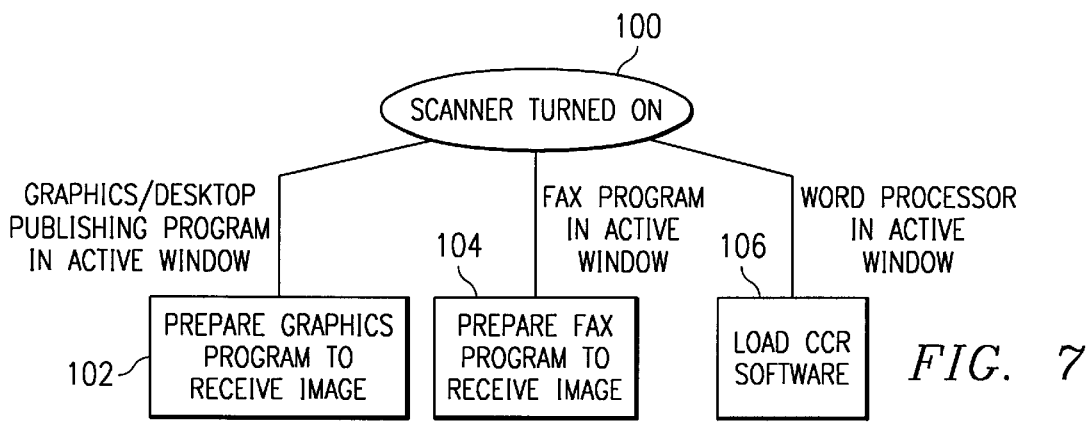
FIG. 7 illustrates a flow diagram providing a first example of operation of the environmental manager responsive to a change in environmental conditions.

FIG. 7 illustrates a simple example where a first informant has determined that the scanner, which is attached to the notebook computer 70, has been turned on. A second informant is registered with the CIM 26 to receive this information. When the information is received in block 100, the second informant determines which application is currently active. This information may be determined by the second informant, or may be from a message which a third informant sends each time the active window changes, or may be the result of a query by the second informant. If a graphics/desktop publishing program is active (block 102), the second informant may adjust the graphics/desktop publishing program to receive an image by setting the TWAIN program to receive at a certain resolution and color depth suitable for publishing. If a fax program is active (block 104), the informant may configure the TWAIN program for scanning a document at 200 dpi in greyscale. If a wordprocessor is in the active window (block 106), the informant may load an OCR (optical character recognition) program and set the TWAIN program to scan at high resolution in black and white. Alternatively, if the active program was an EM-aware application 24, it could perform the setup of the TWAIN program based on information that the scanner was turned on.

Figure 8:
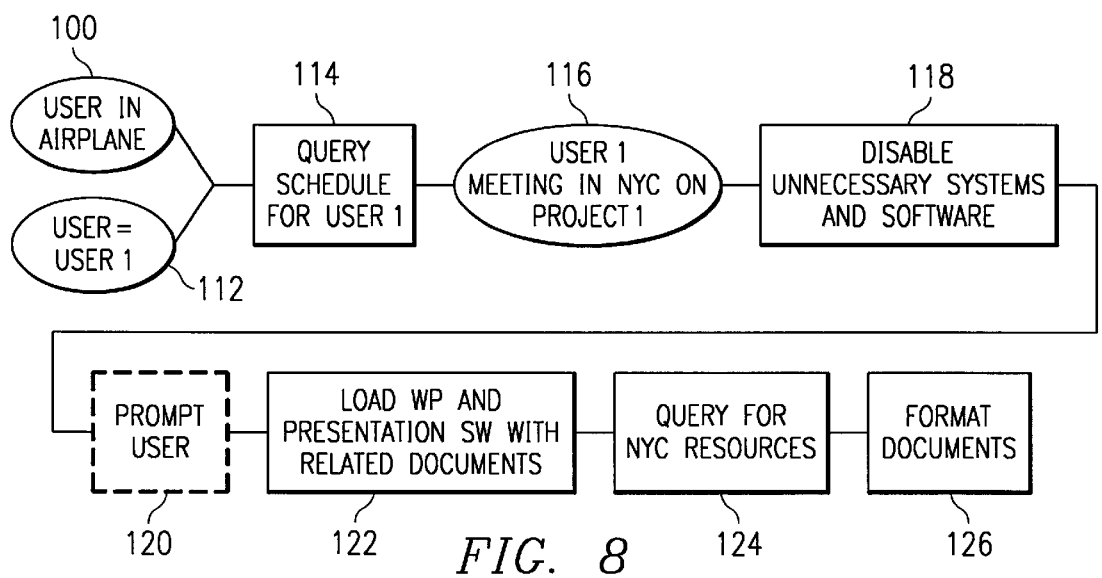
FIG. 8 illustrates a flow diagram providing a second example of operation of the environmental manager responsive to a change in environmental conditions.

FIG. 8 illustrates a scenario where the notebook computer is turned on in an airplane. In block 110, a first informant determines that the computer is on an airplane. A second informant determines in block 112 that the user is User1. Based on this information, a third informant queries the CIM 26 for information from User1's schedule in block 114. The CIM queries the informant or informants registered to supply this information, which forward a response that User1 is due to present information on Project1 in the New York City offices (block 116). A fourth informant has also received the message that the computer is being run on an airplane and has shut down unnecessary systems (such as modem and network hardware) and software (such as a program which monitors disk fragmentation). The third informant then prompts the user about loading the software needed for the upcoming presentation in block 120. The user may be interested in running other software and decline. In the illustration, the prompt is accepted by the user, and the software and documents are loaded in block 122. The EM-aware software initiates a query on resources in the remote offices (from an internal database) in block 124 and formats the documents as necessary.

Autolaunch Capability

A particular category of response to environmental information is autolaunch capability. An autolaunch informant facilitates use of the computer by anticipating which programs will be run by a user in a variety of circumstances.

For purposes of illustration, it will be assumed that the computer has a GUI (graphic user interface) capable of multiple desktops. Each desktop is a separate graphical representation of available documents and programs which may be arranged by the user. A specific GUI is discussed hereinbelow; however, the autolaunch capability is not dependent upon any particular GUI.

Figure 9A:
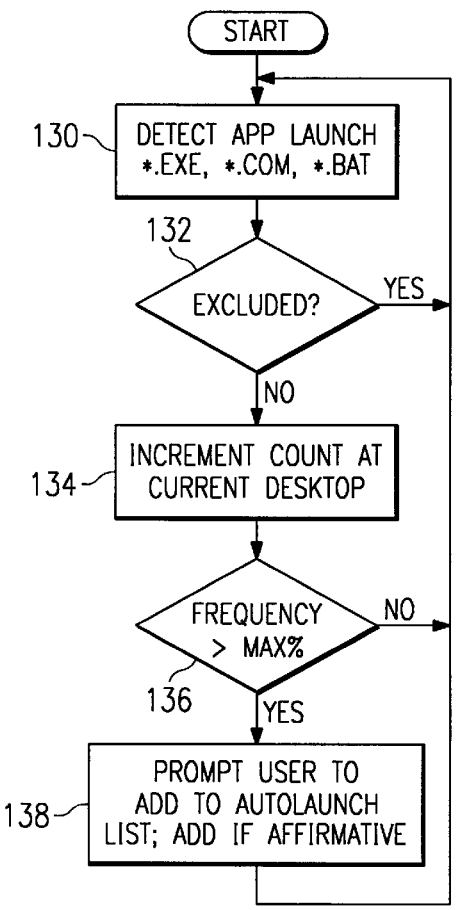
FIGS. 9a and 9b illustrate flow charts describing an autolaunch feature.

A flow chart describing operation of the autolaunch informant is shown in FIG. 9*a*. FIG. 9*a* illustrate the procedure for counting applications to determine those which are frequently use. In block 130, the autolaunch informant detects the loading of an application, which in a WINDOWS 95 operating system would be a *.exe, *.com or *.bat file. Other executables, such as *.dll files are not counted, because they are typically launched by programs rather than directly by users. In decision block 132, the autolaunch informant checks to see if a detected program is on a user-defined exclusion list. This allows the user to eliminate programs which may be launched frequently, such as a file manager or an Internet browser, but does not have a particular association with a desktop or other environmental consideration.

If the launched program is not excluded, then a count for that program is incremented with respect to the current desktop in block 134. Thus, if a word processor is launched in the "office" desktop, its count for that desktop is incremented by one. If the same program is loaded in the "home" desktop, then its count for that desktop is incremented.

In decision block 136, the accumulated count for the program is used to determine the frequency at which the user loads the program while in the particular workspace. This frequency is set as a percentage and compared to a user defined threshold, Max %. If the number of counts in the current desktop exceeds Max % for that desktop, the user is prompted as to whether the application should be placed in an autolaunch list for the current desktop. If the user replies affirmatively, the application name is placed on an autolaunch list for the current desktop.

Figure 9B:
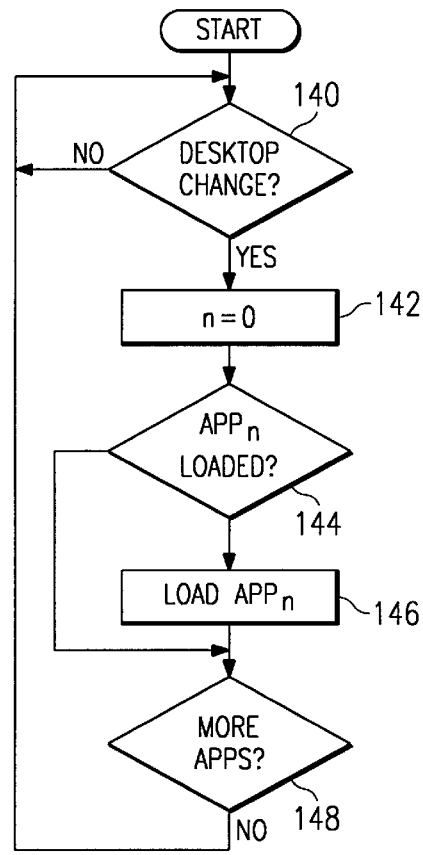

FIG. 9*b* illustrates a flow chart used to automatically launch applications. In block 140, the autolaunch informant detects when a user has changed desktops. In blocks 142, 144, 146 and 148, the autolaunch informant loads each application specified in the autolaunch list for the new desktop (the application may prompt the user to verify that he or she would like the applications to be loaded). If an application is already running, it will not be loaded (see decision block 144).

While the autolaunch informant has been discussed in relation with the change of a desktop, it could also be tied to other detectable environmental changes. Applications could be launched in response to a detected change in physical location (for example, the scheduling program could be loaded each time the user uses the computer in his or her office), detected changes in hardware configuration (for example, an e-mail program could be tied to detection of a network connection) or changes in software configuration (for example, a graphics program could be tied to execution of a desktop publishing program). Thus, step 134 of FIG. 9*a* could increment counts per a variety of environmental factors.

Further, the autolaunch informant could track loading of files other than application program, such as documents. Thus, if a particular spreadsheet was loaded each Friday, the autolaunch program could detect its periodic use and auto-launch the document as well as the spreadsheet application program. Alternatively, the autolaunch program could note the last document loaded by an application in each desktop, such that the most recently loaded document was loaded with each auto-launched application.

Graphical User Interface

FIGS. 10–17 illustrate a graphical user interface 200 which facilitates use of the computer. This interface is not necessary for use of the environmental managing functions discussed above, and can be used in conjunction with any operating system which supports, or can be made to support, multiple desktops.

Figure 10:
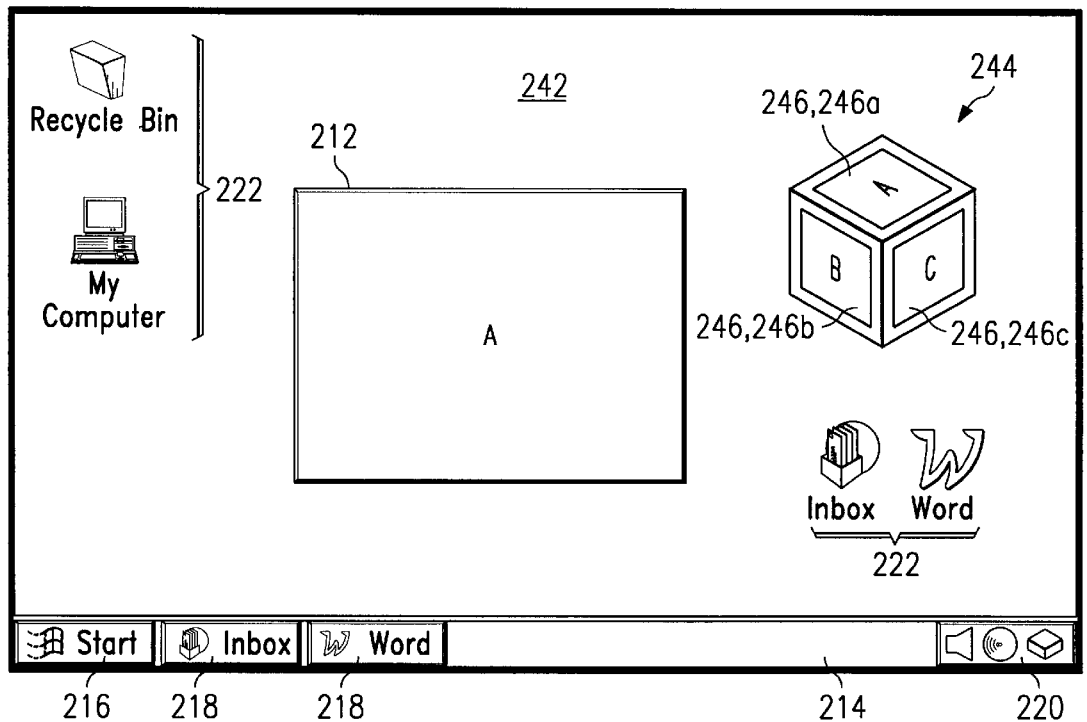
FIG. 10 illustrates a polyhedron shaped graphical user interface for controlling a multi-workspace environment.

FIG. 10 illustrates a GUI 240 which is easier to use than prior art GUIs and supports unlimited desktops with full visual impact. In the preferred embodiment, the GUI 240 not only supports multiple desktops, but also supports multiple workspaces. Whereas desktops differ only in their visual appearance and different sets of icons and active program windows, a workspace takes into account the environment of the computer. Accordingly, a computer may be connected to a network, a docking station and multiple laser printers, when used in the office environment, the same computer may be connected only to an inkjet printer in the home environment. Thus, when used with software which can distinguish different environments, the GUI described herein can communicate with the environmental manager software to detect and react to changes in resources.

The GUI 240 changes workspaces 242 responsive to user interaction with a multi-faced workspace object 244 (hereinafter cube 244). While a cube showing three of its faces 246 (individually referenced as faces 246*a*, 246*b* and 246*c*) is used herein, other multi-faced three dimensional objects such as tetrahedron-, octahedron- or other polyhedron-shaped objects could also be used. A miniaturized bitmap of the cube is also placed in the tray area.

Each workspace can have a unique set of workspace icons 222, icon arrangement, wallpaper 212, and color scheme. The user controls the active workspace 242 by selecting a desired workspace from the cube 244, as will be discussed in greater detail hereinbelow. The cube 244 provides a visual representation of a workspace on each of its faces 246. In FIG. 10, the image on each face 246 is indicated by a letter (for example, "A", "B" or "C"), with the corresponding wallpaper 212 similarly labeled. In actual use, the faces 246 would provide a bitmap image to identify the workspace (see FIG. 11). The uppermost face 246*a* indicates the active workspace 242. The remaining faces 246*b* and 246*c* are used to switch to a different workspaces which are not currently active. It should be noted that the "active" workspace 242 is the workspace which is currently being viewed by the user; the remaining workspaces may be supporting applications which are active but unseen by the user.

To switch to a different workspace, the user can simply click on one of the inactive faces 246*b* or 246*c* (alternative methods for switching workspaces are discussed below). To expose workspaces not currently accessible through the three faces currently being displayed, the cube can be rotated (see FIGS. 14*a*–*d*).

Figure 11:
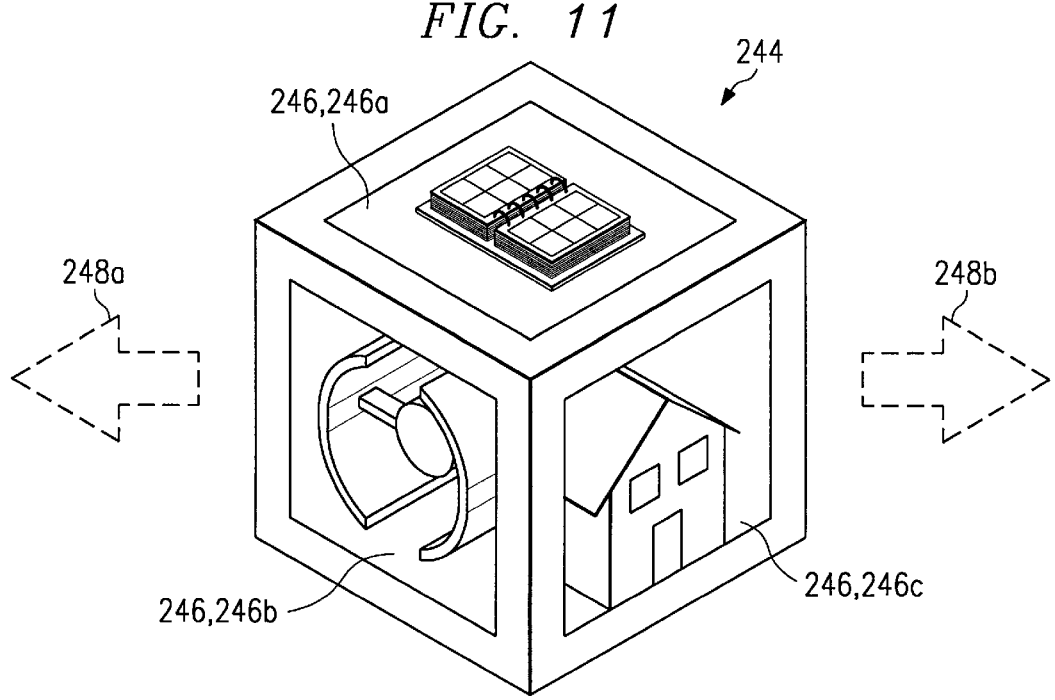
FIG. 11 illustrates a detailed view of a cube used in the interface of FIG. 10.

The cube 244 is shown in greater detail in FIG. 11. Each face 246 has a bitmap image (shown in proper perspective depending upon the associated face 246*a*, 246*b*, or 246*c*). For example, the active workspace face 246*a* has a bitmap of an appointment book, which would be appropriate for a scheduling workspace. Face 246*b* has a space ship bitmap, which would be appropriate for a workspace for playing games. Face 246*c* has a house bitmap, which would be appropriate for using the computer at home.

Arrows 248*a* and 248*b* are placed to the left and right of cube 244, respectively. These arrows are shown in phantom to indicate that they are normally invisible, but are displayed when the user's pointer is placed proximate the cube 244. These arrows can be used to rotate the cube to display additional workspaces, as will be discussed in connection with FIGS. 14*a*–*d*.

The bitmaps for the faces may be acquired in a number of ways. A Customize dialog box (shown in FIG. 15*d*) allows the user to select from a plurality of image or icon files on the computer or network. Additionally, in the preferred embodiment, the user can select a portion of the workspace or other image using a software tool and drag-and-drop the selection to an exposed face of the cube to set its image (shown in FIG. 15*e*). Other examples of bitmaps which would be appropriate would be a bitmap from a digitized image of a persons face for his or her main workspace, an airplane icon for a workspace containing programs used during travel, and so on.

Figure 12:
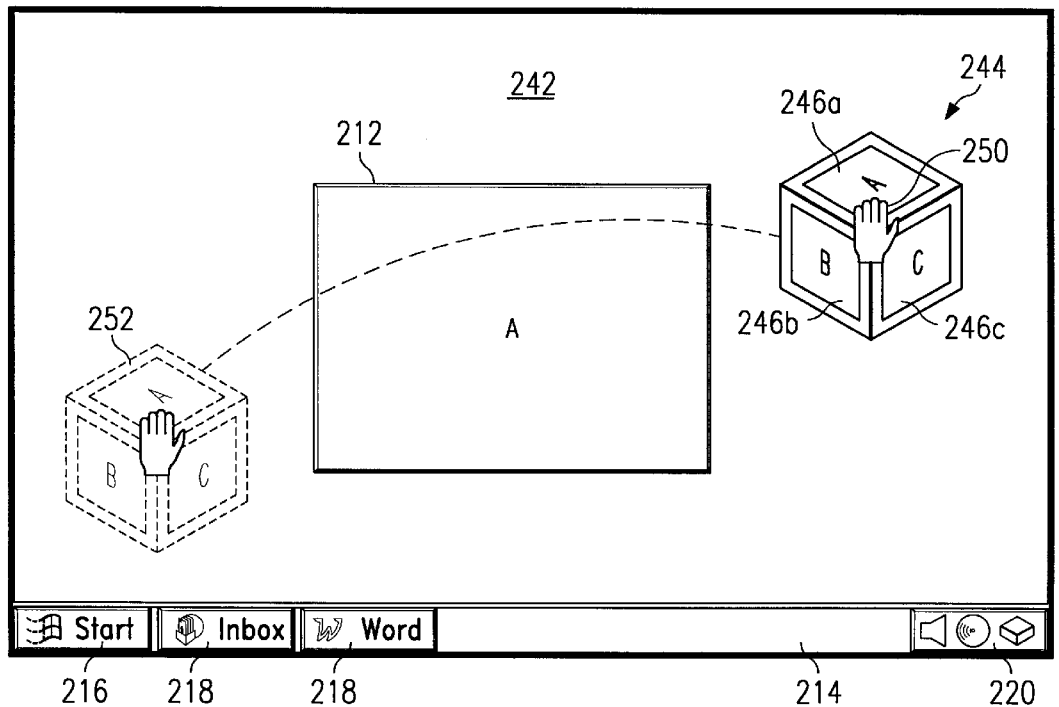
FIG. 12 illustrates movement of the cube on a workspace.

FIG. 12 illustrates a preferred method of moving the cube 244 on the workspace 242. When the cursor is placed proximate the intersection of the three cube faces 246, it turns into a hand 250 (or other appropriate cursor shape), indicating that the mouse (or other user input device) is positioned properly to move the cube 244. As the mouse is moved by clicking and holding on the left mouse button and dragging on the mouse, an image 252 (such as a 50% transparent image or an outline) of the cube 244 moves across the screen. When the left mouse button is released, the position of the cube moves to the location where the transparent image was located at the time of the release.

In operation, the user may move the cube 244 to various positions on the screen not covered by an active application window. Also, in the preferred embodiment, the user can optionally set the cube so that it is always on top of the workspace (i.e., the topmost application window will not cover the cube 244).

Figure 13A:
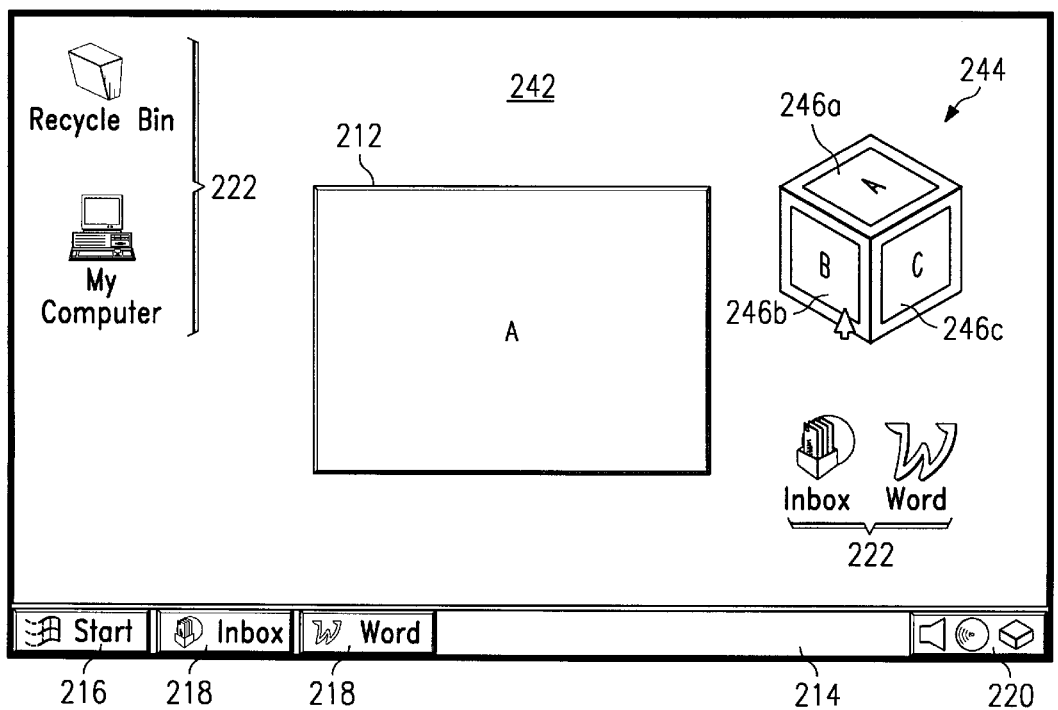
FIGS. 13a and 13b illustrate use of the cube to select a workspace.
Figure 13B:
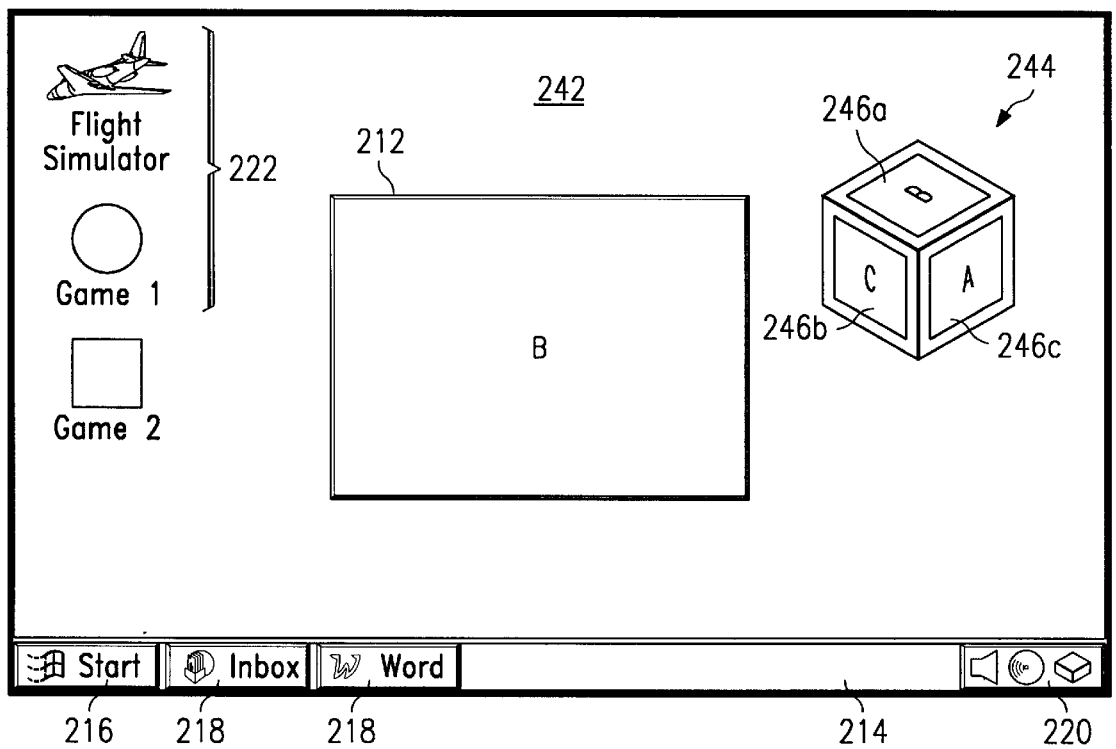

FIGS. 13*a* and 13*b* illustrate how the cube can be used to switch workspaces 242. In FIG. 13*a*, the "A" workspace is active, as indicated by face 246*a* of the cube 244. Consequently, the icons, wallpaper and color scheme associated with the "A" workspace are displayed to the user. By placing the cursor over the face 246*b* of the cube 244, the "B" workspace is selected by clicking on the left mouse button. Similarly, the "C" workspace could have been selected by clicking on the left mouse button while the cursor was placed over face 246*c*.

FIG. 13*b* illustrates the result of the workspace switch initiated in FIG. 13*a*. The workspace elements associated with the "B" workspace appear and the bitmap associated with the "B" workspace is placed on the active workspace face 246*a*. The bitmap associated with the "C" workspace moves to face 246*b* and the bitmap associated with the "A" workspace moves to face 246*c*.

Figure 14A:
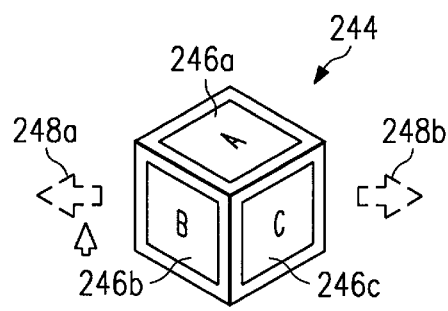
FIGS. 14a, 14b, 14c and 14d illustrate rotation of the cube to expose additional workspaces.
Figure 14B:
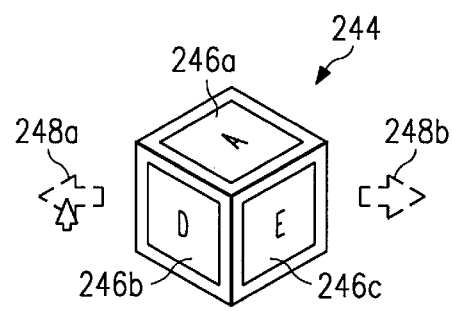

FIGS. 14*a*–14*d* illustrate rotation of the cube to expose additional workspace bitmaps. When the user moves the cursor to within a predetermined number of pixels of the right or left of the cube 244, the rotation arrows 248*a* and 248*b* appear. By clicking on the left arrow, workspace images rotate to the left to show two additional workspace bitmaps, as shown in FIG. 14*b*.

As a result of a click on left rotation arrow 248a, the bitmaps associated with workspaces "B" and "C" are replaced with the bitmaps associated with workspaces "D" and "E", respectively. The bitmap for workspace "A" remains on the active workspace face 246a, since rotation of the cube 244 by itself does not affect the active workspace.

Figure 14C:
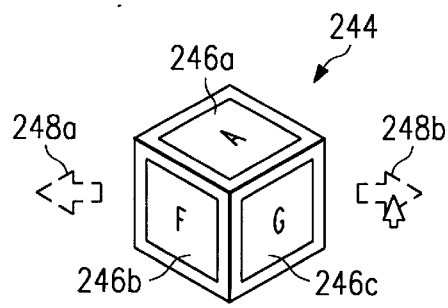
Figure 14D:
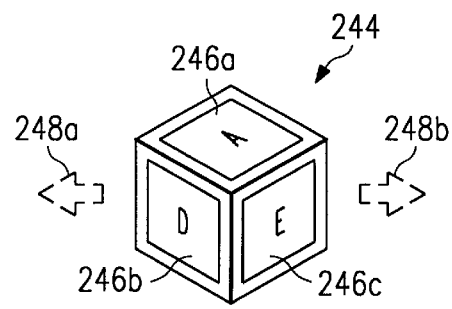

In FIG. 14b, the left rotation arrow 248a is again clicked with the left mouse button, resulting in movement of the bitmaps for workspace "F" and "G" being displayed on the faces 246b and 246c respectively. This orientation of the cube is shown in FIG. 14c. By left-click on the right rotation arrow 248b, the bitmaps corresponding to workspaces "D" and "E" are restored to faces 246b and 246c, respectively.

In operation, a user can quickly cycle through multiple workspaces using the left and right rotation arrows. Each face shows a bitmap chosen by the user to identify the workspace. If a bitmap does not readily identify a workspace, the name of the workspace can be seen by locating the cursor over that face for a predetermined amount of time. No matter how many workspaces are supported by the cube 246, the bitmaps remain the same size. Further, no space on the taskbar is used.

FIGS. 15a–15j illustrate examples of menu functions which could be accessed by right-clicking on the cube 244. When a user performs a right click on the cube, a menu 254 appears, headed by the name of the workspace (shown in FIG. 15a as "My Games") selected by the user. The user may right-click on either the active workspace face 246a or one of the workspace represented on faces 246b or 246c.

Figure 15A:
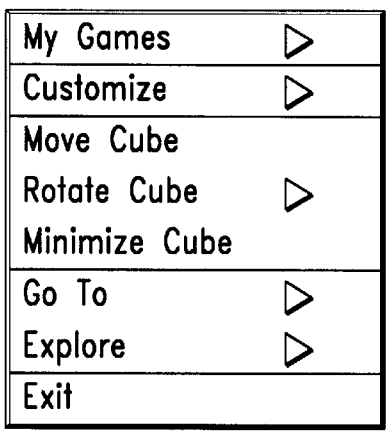
FIGS. 15a–15j illustrate control of the graphical user interface through menu selections.
Figure 15B:
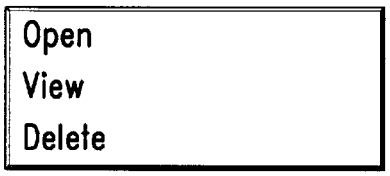

By pressing the workspace name (i.e., My Games), the submenu 255 shown in FIG. 15b appears. The "Open" menu choice is used to open the named workspace (if such workspace is not already the active workspace). The View menu choice allows the user to see a directory listing of the named workspace, similar to the "Explore" menu choice (from which the user may select any workspace), described below. The "Delete" menu choice removes the workspace information associated with the named workspace from the workspace database. If the deleted workspace information corresponds to the active workspace, the active workspace becomes the workspace represented by face 246b.

Figure 15C:

The "Customize" sub-menu choice activates the menu 256 shown in FIG. 15c. The Customize sub-menu provides three choices: Display Properties, Auto Launch and Sounds Properties.

The "Auto Launch" menu choice allows the user to set an application for managing the applications designated to automatically load upon entering a workspace, as described in connection with FIGS. 9a–9b.

The "Sounds Properties" menu choice allows the user to set sounds used for various acts of the cube 244, such as rotation, change of workspace, minimization and maximization.

Figure 15F:
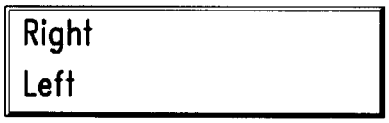
Figure 15G:
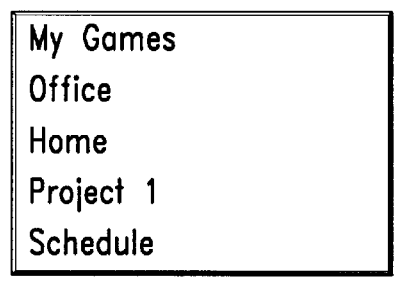
Figure 15H:
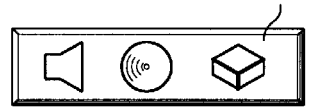
Figure 15I:
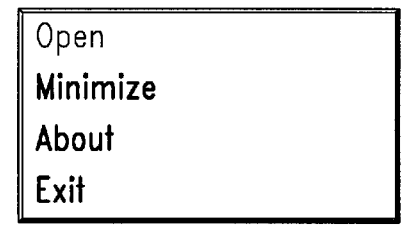
Figure 15J:
Figure 15D:
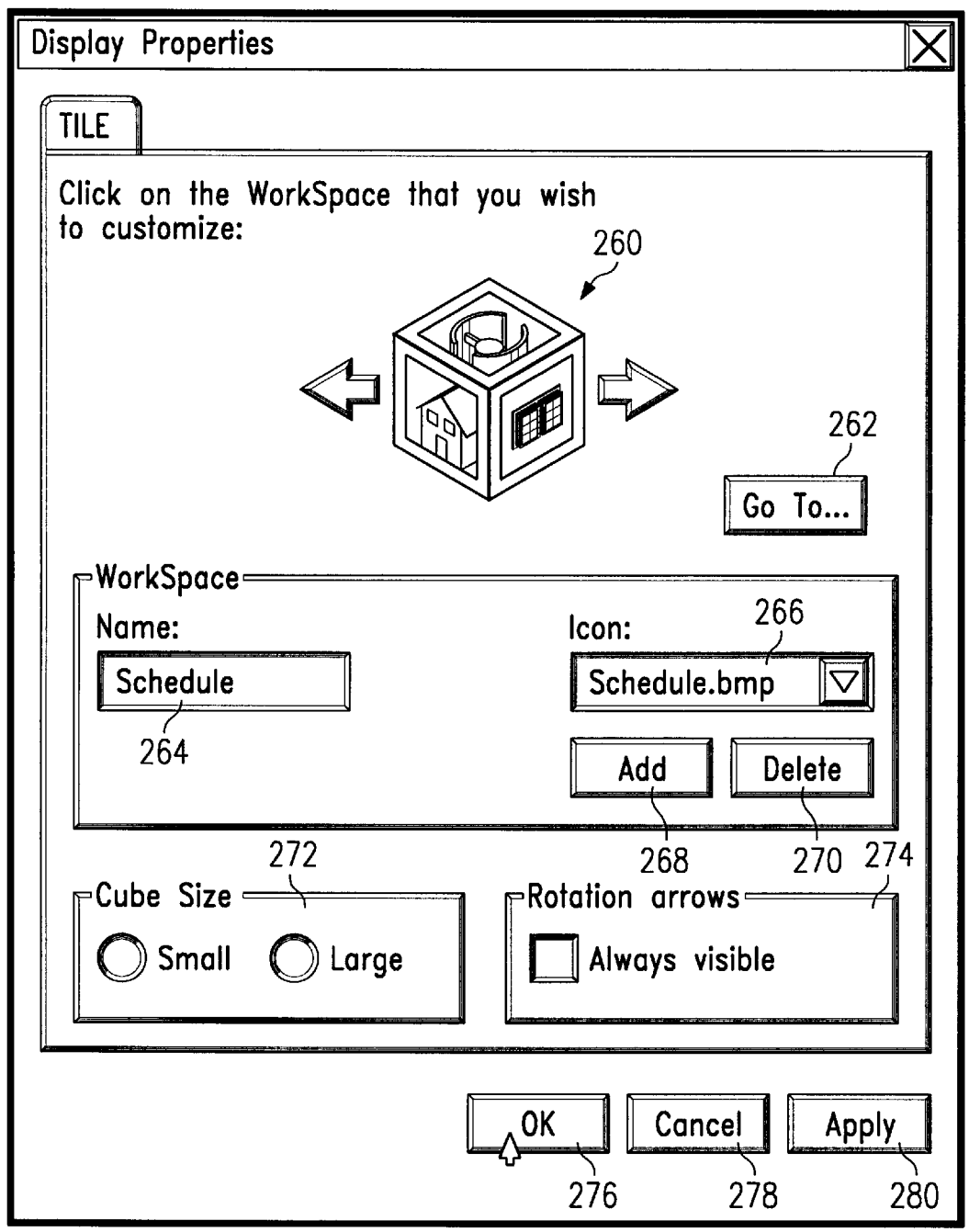

The "Display Properties" menu choice opens the Display Properties dialog box 258, shown in FIG. 15d. A representation 260 of the cube 244 and arrows 248a and 248b is shown at the top of the dialog box 258. This cube representation 260 is interactive to allow the user to select a workspace face using the same cursor movements as selecting a workspace. Alternatively, a workspace can be chosen through the GoTo button 262, which provides a list of all workspace names when it is pressed.

The name (which appears in a box when the cursor is held over the associated face 246 for a predetermined time period) can be set by the user in text box 264. An icon (bitmap file) can be chosen from the drop down box 266. Workspaces can be added to or deleted from the list of available workspaces using Add and Delete buttons 268 and 270, respectively.

The cube size can be chosen through radio buttons 272. In the preferred embodiment, a large cube is 84×84 pixels in size and a small cube is 32×32 pixels in size. Intermediate sizes could also be provides, as well as a completely scaleable cube. An alternative sizing method would allow the user to interact with the cube 244 on the workspace, for example by pulling on corner tabs associated with the cube 244.

In checkbox 274, the user can choose whether to keep the rotation arrows 248a and 248b always visible or visible only when the cursor is placed proximate the cube.

The OK button 276 set any changes made by the user. The Cancel button 278 reverts the cube 244 to its state prior to any changes made in the dialog box 258.

The Apply button 280 allows the user to preview changes to the cube 244, but the prior state can not be restored by using the Cancel button 278. It should be noted that while the dialog box of FIG. 15d illustrates a number of items which could be configured for each workspace, other properties, such as screen resolution and other environmental settings, could be configured through the Display Properties dialog box 258.

Figure 15E:
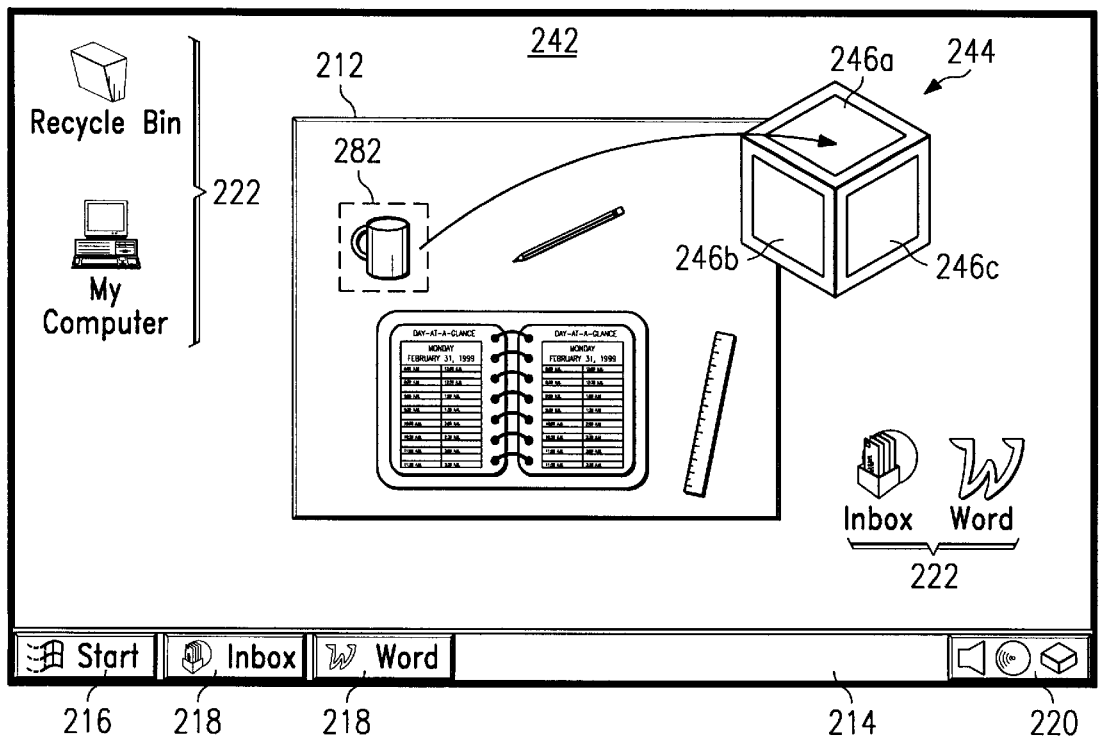

FIG. 15e provides an alternative method for assigning a bitmap to a cube face 246. In this embodiment, the user selects a square area 282 of the display screen. This area may be part of a document or image file displayed in an active application window, a portion of the wallpaper 212, or an icon 222. The user then clicks and drags on the selected area to one of the exposed cube faces 246. The bitmap for that face 246 is then replaced with a bitmap formed from the selected area (the bitmap displayed is transformed to appear angled as dictated by the relevant cube face).

Referring again to FIG. 15a, the "Move Cube" menu choice changes the cursor to a hand, which can grab the cube 244 and move it to any location on the active workspace 242. This procedure is shown in connection with FIG. 12.

The "Rotate Cube" menu choice provides the GoTo submenu 283 shown in FIG. 15f. The cube can be rotated left or right by pressing either the Left or Right menu choices in this submenu.

Returning to FIG. 15a, the Minimize Cube menu choice causes the cube to be removed from the screen but remains as a tray icon 288 in the tray area 220 of the taskbar 214.

FIG. 15g illustrates the "GoTo" submenu 284. The GoTo submenu 284 lists the names of all workspaces. When a name is selected, the workspace switched to that selected workspace and the associated bitmap is placed on the active workspace face 246a of the cube 244.

Returning to FIG. 15a, the "Explore" menu choice opens a submenu listing the workspaces, as shown in FIG. 15g. When a workspace is selected, the WINDOWS 95 (or other operation system) file manager is executed, set at the directory holding the files located on the selected workspace. Alternatively, a customized view of the workspace settings, files, shortcuts and other environmental settings associated with a workspace could be shown in place of the file manager display. In addition to using the menus to obtain a display of a workspace's contents, the user could interact with the cube 244; for example, the user could double right click on a face 246 to obtain a list of the workspace's contents.

The tray area 220 is shown in FIG. 15h. By double (left) clicking on the cube tray icon 288 while the cube 244 is minimized, the cube 244 is restored to the workspace 242. By right clicking on the cube tray icon 288 while the cube 244 is open (visible on the workspace 244), the menu 90 shown in FIG. 15*i* appears. From this menu, the user can minimize the cube 244, Exit (terminate the GUI) or determine the version number and related information using the About menu choice. Other actions such as a help program could be added to this menu.

If the user right clicks the cube tray icon 288 while the cube 244 is minimized (i.e., the GUI is running, but the cube 244 is not visible), the menu 292 shown in FIG. 15*j* is displayed. The cube 244 can be returned to the workspace 242 by pressing the Restore menu selection, or the GUI can be terminated using the Exit menu choice.

Figure 16:
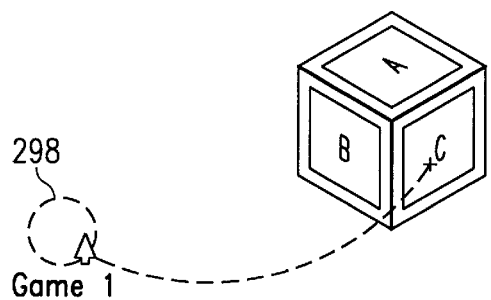
FIG. 16 illustrates use of the cube to move and copy workspace objects between workspaces.

FIG. 16 illustrates movement of icons from one workspace to another. To move an icon from an active workspace to another workspace, the cube 244 is rotated to show the destination workspace. The icon is then moved into the face 246 showing the destination workspace using a left-click and drag. In the example shown in FIG. 16, the Game1 icon 298 is copied to the "C" workspace shown on face 246*c*.

An alternative method is to use a right-click and drag to move an icon into the face 246 associated with a desired destination workspace. A menu will then appear allowing the user to select either "Copy Here" or "Move Here".

Figure 17:
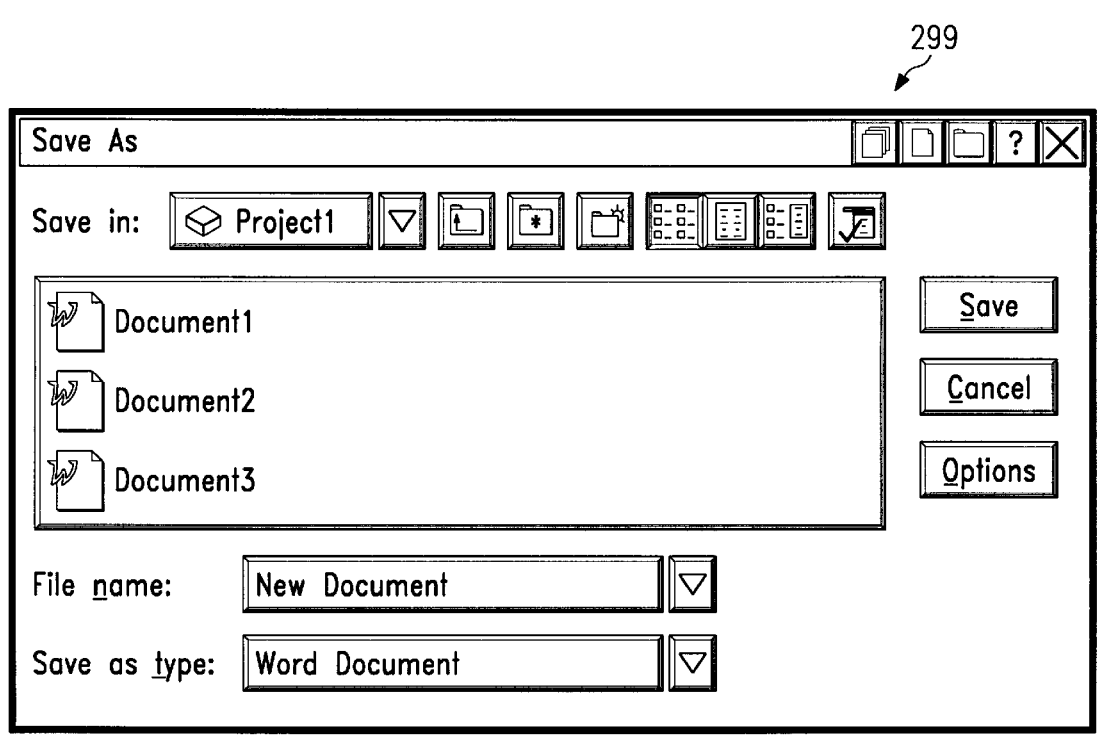
FIG. 17 illustrates a dialog box used to save a document from an active application to a desired workspace.

FIG. 17 illustrates a "Save As" dialog box 299, which can be used to save a document from an application to a particular workspace. The drop down box allows the user to select a workspace name (in this case "Project1"). The file "New Document" is then saved to a directory associated with the selected workspace, and an icon is placed on the workspace which identifies the document. Alternatively, a shortcut file associated with the document can be placed in the selected workspace's directory and a shortcut icon can be placed on the selected workspace.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of controlling operation of a computer, comprising the steps of:
    detecting changes in an environment associated with the computer wherein one of said changes in environment is a change in location of use of the computer;
    determining an optimum configuration based on the new environment; and
    modifying the configuration of the computer based on the optimum configuration.

2. The method of claim 1 wherein said step of determining an optimum configuration comprises the step of using a prior configuration previously used by the user.

3. The method of claim 1 wherein said step of determining an optimum configuration comprises the step of determining a set of programs to load.

4. The method of claim 1 wherein said step of determining an optimum configuration comprises the step of modifying the operation of hardware systems of the computer.

5. The method of claim 4 wherein said step of modifying the operation of hardware systems comprises the step of reducing power to one or more hardware systems.

6. A method of controlling operation of a computer, comprising the steps of:
    detecting changes in an environment associated with the computer wherein one of said changes in environment is a change in the user of the computer;
    determining an optimum configuration based on the new environment; and
    modifying the configuration of the computer based on the optimum configuration.

7. The method of claim 6 wherein said step of determining an optimum configuration comprises the step of using a prior configuration previously used by the user.

8. The method of claim 6 wherein said step of determining an optimum configuration comprises the step of determining a set of programs to load.

9. The method of claim 6 wherein said step of determining an optimum configuration comprises the step of modifying the operation of hardware systems of the computer.

10. The method of claim 9 wherein said step of modifying the operation of hardware systems comprises the step of reducing power to one or more hardware systems.

11. A method of controlling operation of a computer, comprising the steps of:
    detecting changes in an environment associated with the computer wherein one of said changes in environment is a change in a desktop screen used as a graphical user interface;
    determining an optimum configuration based on the new environment; and
    modifying the configuration of the computer based on the optimum configuration.

12. The method of claim 11 wherein said step of determining an optimum configuration comprises the step of using a prior configuration previously used by the user.

13. The method of claim 11 wherein said step of determining an optimum configuration comprises the step of determining a set of programs to load.

14. The method of claim 11 wherein said step of determining an optimum configuration comprises the step of modifying the operation of hardware systems of the computer.

15. The method of claim 14 wherein said step of modifying the operation of hardware systems comprises the step of reducing power to one or more hardware systems.

16. A computer system with an environmental manager for controlling operation of a computer, comprising:
    processing circuitry for:
        detecting changes in an environment associated with the computer wherein one of said changes in environment is a change in location of use of the computer;
        determining an optimum configuration based on the new environment; and
        modifying the configuration of the computer based on the optimum configuration.

17. The computer system of claim 16 wherein determining an optimum configuration comprises the using a prior configuration previously used by the user.

18. The computer system of claim 16 wherein determining an optimum configuration comprises determining a set of programs to load.

19. The computer system of claim 16 wherein determining an optimum configuration comprises modifying the operation of hardware systems of the computer.

20. The computer system of claim 19 wherein modifying the operation of hardware systems comprises reducing power to one or more hardware systems.

21. A computer system with an environmental manager for controlling operation of a computer, comprising the steps of:
    processing circuitry for:
        detecting changes in an environment associated with the computer wherein one of said changes in environment is a change in the user of the computer;

determining an optimum configuration based on the new environment; and modifying the configuration of the computer based on the optimum configuration.

22. The computer system of claim 21 wherein determining an optimum configuration comprises the using a prior configuration previously used by the user.

23. The computer system of claim 21 wherein determining an optimum configuration comprises determining a set of programs to load.

24. The computer system of claim 21 wherein determining an optimum configuration comprises modifying the operation of hardware systems of the computer.

25. The computer system of claim 24 wherein modifying the operation of hardware systems comprises reducing power to one or more hardware systems.

26. A computer system with an environmental manager for controlling operation of a computer, comprising the steps of:

processing circuitry for:
detecting changes in an environment associated with the computer wherein one of said changes in environment is a change in the desktop screen used as a graphical user interface;
determining an optimum configuration based on the new environment; and
modifying the configuration of the computer based on the optimum configuration.

27. The computer system of claim 26 wherein determining an optimum configuration comprises the using a prior configuration previously used by the user.

28. The computer system of claim 26 wherein determining an optimum configuration comprises determining a set of programs to load.

29. The computer system of claim 26 wherein determining an optimum configuration comprises modifying the operation of hardware systems of the computer.

30. The computer system of claim 29 wherein modifying the operation of hardware systems comprises reducing power to one or more hardware systems.

31. A method of executing programs in a computer, comprising the steps of:

detecting a change from one desktop to another desktop;
determining in the computer whether each of a set of programs associated with said change is currently loaded; and
automatically loading the programs in said set which are not currently loaded.

32. The method of claim 31 and further comprising the step of adding programs to said set of programs by:

maintaining information indicative of the use of each program in each desktop; and
comparing said information to a threshold.

33. The method of claim 32 wherein said maintain step comprises the step of maintaining information on the frequency at which each program is used with each desktop.

34. The method of claim 33 and further comprising the step of prompting the user for affirmation prior to adding one of said programs to said set.

35. The method of claim 34 wherein said step of automatically loading programs includes the step of loading a document associated with the detected change of environment.

36. The method of claim 33 wherein said step of automatically loading programs includes the step of loading a document associated with the detected change of environment.

37. The method of claim 32 and further comprising the step of prompting the user for affirmation prior to adding one of said programs to said set.

38. The method of claim 37 wherein said step of automatically loading programs includes the step of loading a document associated with the detected change of environment.

39. The method of claim 32 wherein said step of maintaining information indicative of the use of each program in each desktop comprises the step of counting the number of times each program file is opened in each desktop.

40. The method of claim 39 wherein said step of automatically loading programs includes the step of loading a document associated with the detected change of environment.

41. The method of claim 32 wherein said step of automatically loading programs includes the step of loading a document associated with the detected change of environment.

42. The method of claim 31 wherein said step of automatically loading programs includes the step of loading a document associated with the detected change of environment.

43. A method of executing programs in a computer, comprising the steps of:

determining whether the user changed desktops in a user interfaces
determining in the computer whether each of a set of programs associated with said change is currently loaded; and
automatically loading the programs in said set which are not currently loaded.

44. The method of claim 43 wherein said step of automatically loading programs includes the step of loading a document associated with the detected change of environment.

45. A method of executing programs in a computer, comprising the steps of:

detecting a change in environment associated with the computer being operated in a new location;
determining in the computer whether each of a set of programs associated with said change is currently loaded; and
automatically loading the programs in said set which are not currently loaded.

46. The method of claim 45 wherein said step of automatically loading programs includes the step of loading a document associated with the detected change of environment.

47. A computer comprising:

processing circuitry for:
detecting a change from one desktop to another;
determining in the computer whether each of a set of programs associated with said change is currently loaded; and
automatically loading the programs in said set which are not currently loaded.

48. The computer of claim 47 wherein said processing circuitry further adds programs to said set of programs by:

maintaining information indicative of the use of each program in each desktop; and
comparing said information to a threshold.

49. The computer of claim 48 wherein said processing circuitry maintains information by storing information on the frequency at which each program is used with each desktop.

50. The computer of claim 49 wherein said processing circuitry further prompts the user for affirmation prior to adding one of said programs to said set.

51. The computer of claim 48 wherein said processing circuitry further prompts the user for affirmation prior to adding one of said programs to said set.

52. The computer of claim 48 wherein said processing circuitry stores information indicative of the use of each program in each desktop by counting the number of times each program file is opened in each desktop.

53. The computer of claim 47 wherein said processing circuitry detects a change in environment by determining that the time for a scheduled event has occurred.

54. The computer of claim 47 wherein said processing circuitry further loads a document associated with the detected change of environment into one of one of said application programs.

55. A computer comprising:

processing circuitry for:

detecting a change in environment by determining whether the user changed desktops in a user interface associated with the computer;

determining in the computer whether each of a set of programs associated with said change is currently loaded; and automatically loading the programs in said set which are not currently loaded.

56. A computer comprising:

processing circuitry for:

detecting a change in environment by determining that the computer is being operated in a new location;

determining in the computer whether each of a set of programs associated with said change is currently loaded; and automatically loading the programs in said set which are not currently loaded.

\* \* \* \* \*